(12) United States Patent
Askan

(10) Patent No.: US 11,373,816 B2
(45) Date of Patent: Jun. 28, 2022

(54) CIRCUIT BREAKER

(71) Applicant: Eaton Intelligent Power Limited, Dublin (IE)

(72) Inventor: Kenan Askan, Vienna (AT)

(73) Assignee: Eaton Intelligent Power Limited, Dublin (IE)

( * ) Notice: Subject to any disclaimer, the term of this patent is extended or adjusted under 35 U.S.C. 154(b) by 413 days.

(21) Appl. No.: 16/331,542

(22) PCT Filed: Sep. 7, 2017

(86) PCT No.: PCT/EP2017/072533
§ 371 (c)(1),
(2) Date: Mar. 8, 2019

(87) PCT Pub. No.: WO2018/046632
PCT Pub. Date: Mar. 15, 2018

(65) Prior Publication Data
US 2019/0206640 A1    Jul. 4, 2019

(30) Foreign Application Priority Data

Sep. 9, 2016   (DE) ............... 10 2016 117 004.6

(51) Int. Cl.
*H01H 9/54* (2006.01)
*H02H 1/00* (2006.01)
(Continued)

(52) U.S. Cl.
CPC .......... *H01H 9/542* (2013.01); *H02H 1/0007* (2013.01); *H02H 3/021* (2013.01);
(Continued)

(58) Field of Classification Search
CPC ............ H01H 9/542; H01H 2009/546; H01H 2009/544; H01H 1/0007; H02H 1/0007; H02H 3/021; H02H 3/08
(Continued)

(56) References Cited

U.S. PATENT DOCUMENTS 7,916,438 B2   3/2011  Ward
8,217,536 B2   7/2012  Koshizuka et al.
(Continued)

FOREIGN PATENT DOCUMENTS

CN    101589528 A    11/2009
CN    101609983 A    12/2009
(Continued)

*Primary Examiner* — Kevin J Comber
(74) *Attorney, Agent, or Firm* — Leydig, Voit & Mayer, Ltd.

(57) ABSTRACT

A low-voltage circuit breaker includes: at least one external conductor section of an external conductor power terminal of the low-voltage circuit breaker connected to an external conductor load terminal of the low-voltage circuit breaker; and a neutral conductor section of a neutral conductor connection of the low-voltage circuit breaker connected to a neutral conductor load terminal of the low-voltage circuit breaker. A mechanical bypass switch is arranged in the at least one external conductor section. A semiconductor circuit arrangement of the low-voltage circuit breaker is switched parallel to the bypass switch. A first current measuring arrangement is arranged in the at least one external conductor section, which is connected to an electronic control unit of the low-voltage circuit breaker. The electronic control unit is configured to actuate the bypass switch and the semiconductor circuit arrangement when a prespecifiable overcurrent is detected by the current measuring arrangement.

10 Claims, 1 Drawing Sheet

(51) Int. Cl.
*H02H 3/02* (2006.01)
*H02H 3/08* (2006.01)

(52) U.S. Cl.
CPC ......... *H02H 3/08* (2013.01); *H01H 2009/544* (2013.01); *H01H 2009/546* (2013.01)

(58) Field of Classification Search
USPC .......................................................... 361/42
See application file for complete search history.

(56) References Cited

U.S. PATENT DOCUMENTS

| | | | |
|---|---|---|---|
| 8,274,767 | B2 | 9/2012 | Fukuda |
| 8,432,649 | B2 | 4/2013 | Seon |
| 10,777,374 | B2 * | 9/2020 | Morita ................... H01H 9/542 |
| 2007/0121257 | A1 * | 5/2007 | Maitra ................... H01H 9/542 |
| | | | 361/2 |
| 2011/0102052 | A1 | 5/2011 | Billingsley et al. |
| 2014/0313628 | A1 * | 10/2014 | Hafner ................. H01H 33/596 |
| | | | 361/91.5 |
| 2017/0236676 | A1 | 8/2017 | Bartonek |
| 2019/0206638 | A1 * | 7/2019 | Askan .................... H01H 9/542 |
| 2019/0206639 | A1 * | 7/2019 | Askan .................... H01H 9/563 |
| 2019/0252143 | A1 * | 8/2019 | Askan .................... H02H 7/222 |
| 2019/0279829 | A1 * | 9/2019 | Askan ...................... H02H 3/08 |
| 2020/0194195 | A1 * | 6/2020 | Askan .................... H01H 9/542 |

FOREIGN PATENT DOCUMENTS

| | | |
|---|---|---|
| CN | 101924342 A | 12/2010 |
| CN | 102217177 A | 10/2011 |
| CN | 202650896 U | 1/2013 |
| DE | 102014108657 A1 | 12/2015 |
| WO | WO 2013071980 A1 | 5/2013 |
| WO | WO 2015028634 A1 | 3/2015 |
| WO | WO 2015193468 A1 | 12/2015 |

\* cited by examiner

CIRCUIT BREAKER

CROSS-REFERENCE TO PRIOR APPLICATIONS

This application is a U.S. National Phase application under 35 U.S.C. § 371 of International Application No. PCT/EP2017/072533, filed on Sep. 7, 2017, and claims benefit to German Patent Application No. DE 10 2016 117 004.6, filed on Sep. 9, 2016. The International Application was published in German on Mar. 15, 2018 as WO 2018/046632 under PCT Article 21(2).

FIELD

The invention relates to a low-voltage circuit breaker.

BACKGROUND

A corresponding circuit breaker is known from WO 2015/028634 A1 filed by the applicant. Attached to the semiconductor circuit arrangement, which is provided to stop a short circuit and which has a rectifier bridge as well as two IGBTs according to WO 2015/028634 A1, also has a snubber, thus an attenuator. The snubber is provided to protect the IGBTs and is built of a resistor and a capacitor switched serially thereto, wherein the resistor is bypassed by a diode.

It has been shown that the diode of the snubber—in the case of breaking a short circuit—increases the stress on the IGBTs considerably. This is due to the circumstance that these are respectively bipolar devices. The IGBTs as well as the diode must therefore be chosen or dimensioned so that they can cope with the high demands during a short circuit. This leads to an increase in the design size of the respective components as well as to an increase in the loop inductance, due to the lengthening of the pathways, and of the break time.

SUMMARY

In an embodiment, the present invention provides a low-voltage circuit breaker, comprising: at least one external conductor section of an external conductor power terminal of the low-voltage circuit breaker connected to an external conductor load terminal of the low-voltage circuit breaker; and a neutral conductor section of a neutral conductor connection of the low-voltage circuit breaker connected to a neutral conductor load terminal of the low-voltage circuit breaker, wherein a mechanical bypass switch is arranged in the at least one external conductor section, wherein a semiconductor circuit arrangement of the low-voltage circuit breaker is switched parallel to the bypass switch, wherein a first current measuring arrangement is arranged in the at least one external conductor section, which is connected to an electronic control unit of the low-voltage circuit breaker, wherein the electronic control unit is configured to actuate the bypass switch and the semiconductor circuit arrangement when a prespecifiable overcurrent is detected by the current measuring arrangement, and wherein a snubber is arranged using a suitable circuit design in parallel with the semiconductor circuit arrangement, the snubber having a capacitor and a resistor, which is arranged in a manner connected in parallel with the capacitor.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a circuit breaker of the type mentioned at the onset, with which the mentioned disadvantages can be avoided, having a small design size and high reliability over a long time period.

Thus, the design of the low-voltage circuit breaker can be simplified. A component having a considerable design size can thereby be omitted. It has been shown that by omitting the diode, the working life of the IGBTs can be increased or less resilient IGBTs can be used. Due to the long time period between two switch processes of a circuit breaker, which is around three minutes according to the standard, no negative effects arise for the low-voltage circuit breaker or the semiconductor circuit arrangement by omitting the diode. By omitting the diode, the low-voltage circuit breaker becomes more compact, affordable and resilient.

Figure 2:
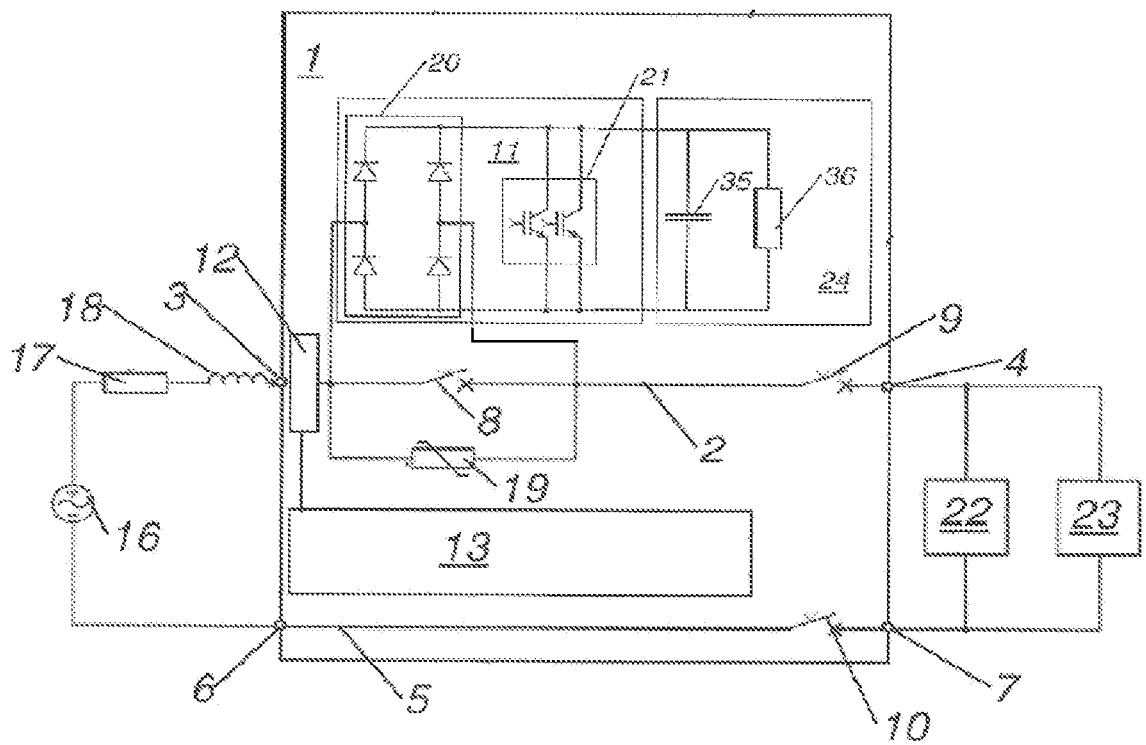
FIG. 2 shows part of a low-voltage circuit breaker according to the preferred embodiment of the present invention.

FIG. 2 shows a low-voltage circuit breaker 1 with at least one external conductor section 2 of an external conductor power terminal 3 of the low-voltage circuit breaker 1 to an external conductor load terminal 4 of the low-voltage circuit breaker 1, and with a neutral conductor section 5 of a neutral conductor connection 6 of the low-voltage circuit breaker 1 to a neutral conductor load terminal 7 of the low-voltage circuit breaker 1, wherein a mechanical bypass switch 8 and a first mechanical disconnector 9 are arranged in series in the external conductor section, wherein a second mechanical disconnector 10 is arranged in the neutral conductor section 5, wherein a semiconductor circuit arrangement 11 of the low-voltage circuit breaker 1 is switched parallel to the bypass switch 8, wherein a first current measuring arrangement 12, particularly comprising a shunt, is arranged in the external conductor section 2, which is connected to an electronic control unit 13 of the low-voltage circuit breaker 1, wherein the electronic control unit 13 is designed to actuate the bypass switch 8, the first mechanical disconnector 9, the second mechanical disconnector 10 and the semiconductor circuit arrangement 11 when a prespecifiable overcurrent, in particular a short-circuit current, is detected by the current measuring arrangement 12, wherein a snubber 24 is arranged using a suitable circuit design in parallel with the semiconductor circuit arrangement 11, wherein the snubber 24 has a capacitor 35 and also a resistor 36, which is arranged in a manner connected in parallel with the capacitor 35.

Thus, the design of the low-voltage circuit breaker 1 can be simplified. A component having a considerable design size can thereby be omitted. It has been shown that by omitting the diode, the working life of the IGBTs 21 can be increased or less resilient IGBTs 21 can be used. Due to the long time period between two switch processes of a circuit breaker 1, which is around three minutes according to the standard, no negative effects arise for the low-voltage circuit breaker 1 or the semiconductor circuit arrangement 11 by omitting the diode. By omitting the diode, the low-voltage circuit breaker 1 becomes more compact, affordable and resilient.

The present circuit breaker 1 and the circuit breaker according to WO 2015/028634 A1 are low-voltage circuit breakers. As is customary, the range up to 1000V AC is considered low voltage. The present low-voltage circuit breaker 1 is, in particular, a purely AC voltage switchgear.

Figure 1:
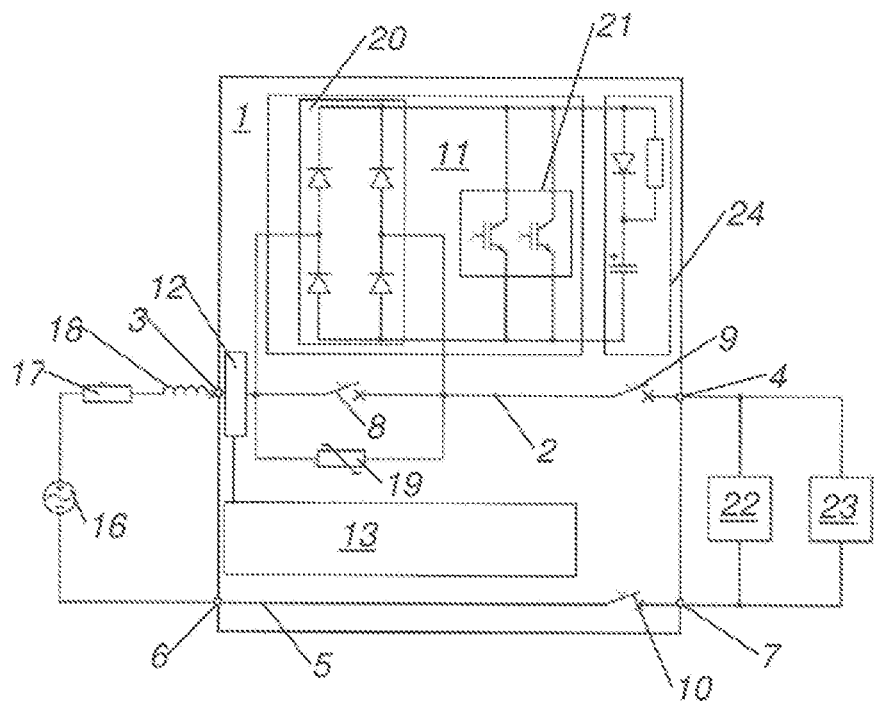
FIG. 1 shows a circuit breaker according to the prior art as a schematic representation.

FIG. 1 shows a circuit breaker according to the prior art, as described in WO 2015/028634 A1, for example. This has an external conductor section 2 as well as a neutral conductor section, as does the present circuit breaker. The external conductor section 2 runs through the circuit breaker 1 from an external conductor power terminal 3 to an external conductor load terminal 4. The neutral conductor section 5 runs through the circuit breaker 1 from a neutral conductor connection 6 to a neutral conductor load terminal 7. The connections 3, 4, 6, 7 in question are each preferably designed as screw connection or plug-in terminals and are arranged in the circuit breaker 1 to be accessible from the outside.

The circuit breaker 1 preferably has an insulating material case.

In the external conductor section 2 a conventional mechanical bypass switch 8 with a simple contact interruption is arranged. Preferably and as shown, a first mechanical disconnector 9 is furthermore arranged in the external conductor section 2, particularly serially to the bypass switch 8. In the neutral conductor section 5 a second mechanical disconnector 10 is preferably arranged. A semiconductor circuit arrangement 11 is switched parallel to the bypass switch 8.

Furthermore, an overcurrent diverter 19 is switched parallel to the bypass switch 8.

The circuit breaker 1 also has a current measuring arrangement 12, which is arranged in the external conductor section 2 and which is preferably designed to comprise a shunt or a shunt resistor. The first current measuring arrangement 12 is preferably arranged serially to both the bypass switch 8 and the semiconductor circuit arrangement 11.

The current measuring arrangement 12 is connected to an electronic control unit 13 of the circuit breaker 1, which is preferably designed to comprise a microcontroller or a microprocessor. The electronic control unit 13 is designed to actuate the bypass switch 8 and the semiconductor circuit arrangement 11, and preferably also the first mechanical disconnector 9 and the second mechanical disconnector 10, therefore to activate or switch these in a prespecifiable manner. To this end, the electronic control unit 13 is connected to the semiconductor circuit arrangement 11, as well as also to activation elements of the mechanical switch, particularly electromagnetic elements, thus of the bypass switch 8, of the first mechanical disconnector 9 and of the second mechanical disconnector 10, preferably using a suitable circuit design. The corresponding connections leading out of the electronic control unit 13 are not shown in FIGS. 1 and 2. When powering off, the voltage is increased after turning off the IGBTs 21 due to the energy stored in the network. The increasing voltage is conducted to the overcurrent diverter 19, which limits the current. When the current is small enough, the first and second mechanical disconnectors 9, 10 are opened.

The semiconductor circuit arrangement 11 preferably has a rectifier switch 20, which is preferably designed as a full bridge, as well as, in the present embodiment, two power semiconductors 21, which are designed here as IGBTs, as actual switch and regulator elements. Thus, a larger power semiconductor 21 can be provided.

In FIG. 1, in addition to the actual circuit breaker 1, the electrical surroundings are also suggested. The supply network is represented by the AC supply voltage source 16, the network's internal resistance 17 and the network inductivity 18. Furthermore, an electrical load 23 and an electrical error 22 are represented in the form of a short circuit.

In a circuit breaker according to the prior art, as shown in FIG. 1, it is provide that a shutdown is performed by the bypass switch 8 and the semiconductor circuit arrangement 11, and the first and second disconnectors 9, 10 are only provided to ensure a galvanic disconnection of the load circuit after a successful shutdown.

In the present low-voltage circuit breaker 1, as represented as a preferable embodiment in FIG. 2, it is provided that the snubber 24 has a capacitor 35, in parallel to which a resistor 36 is arranged. All components or assemblies of the present low-voltage circuit breaker 1, which are not described as alternative different to the low-voltage circuit breaker according to FIG. 1, correspond to the low-voltage circuit breaker according to FIG. 1.

The snubber 24 is designed without a diode. As stated, it has been shown that with the expectedly long time between two switch processes, the diode can be omitted without negative effects arising. It has also been shown that omitting the diode can reduce the stress on the IGBTs 21 in addition to decreasing the design size and the construction costs. By omitting the diode, the electrotechnical performance of the low-voltage circuit breaker 1 could be increased to a surprising degree.

Preferably, it is provided that the resistor 36 is designed with high resistance, wherein the resistor 36 is preferably larger than 5 k$\Omega$, particularly 10 k$\Omega$. The capacitor 35 can be discharged by the high-resistance resistor 36.

When powering on the present low-voltage circuit breaker 1, the first mechanical disconnector 9 and immediately thereafter the second mechanical disconnector 10 is initially closed through a zero crossing of the voltage. Thus, a starting current can be avoided in the capacitor 35 or at least kept small. During the next subsequent zero crossing of the voltage, the semiconductor circuit arrangement 11 is switched on, whereby no larger starting current flows through the IGBTs 21. During the next subsequent zero crossing of the voltage, the bypass switch 8 is closed. The electronic control unit 13 is correspondingly designed to activate the components in question in the specified order.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage circuit breaker, comprising:
at least one external conductor section of an external conductor power terminal of the low-voltage circuit breaker connected to an external conductor load terminal of the low-voltage circuit breaker; and
a neutral conductor section of a neutral conductor connection of the low-voltage circuit breaker connected to a neutral conductor load terminal of the low-voltage circuit breaker,
wherein a mechanical bypass switch is arranged in the at least one external conductor section,
wherein a semiconductor circuit arrangement of the low-voltage circuit breaker is switched parallel to the mechanical bypass switch,
wherein a first current measuring arrangement is arranged in the at least one external conductor section, which is connected to an electronic control unit of the low-voltage circuit breaker,
wherein the electronic control unit is configured to actuate the mechanical bypass switch and the semiconductor circuit arrangement when a prespecifiable overcurrent is detected by the current measuring arrangement,
wherein a snubber is arranged using a suitable circuit design in parallel with the semiconductor circuit arrangement, the snubber having a capacitor and a resistor, which is arranged in a manner connected in parallel with the capacitor,
wherein the capacitor comprises an input terminal and an output terminal,
wherein the semiconductor circuit arrangement comprises an input terminal and an output terminal,
wherein the resistor comprises an input terminal and an output terminal,
wherein the input terminal of the capacitor is electrically coupled to the input terminal of the semiconductor circuit arrangement and to the input terminal of the resistor, and
wherein the output terminal of the capacitor is electrically coupled to the output terminal of the semiconductor circuit arrangement and to the output terminal of the resistor.

2. The low-voltage circuit breaker according to claim 1, wherein a first mechanical disconnector is arranged in the at least one external conductor section, and
wherein the electronic control unit is configured to activate the first mechanical disconnector.

3. The low-voltage circuit breaker according to claim 2, wherein the first mechanical disconnector is arranged in the at least one external conductor section serially to the mechanical bypass switch.

4. The low-voltage circuit breaker according to claim 1, wherein a second mechanical disconnector is arranged in the neutral conductor section, and
wherein the electronic control unit is configured to activate the second mechanical disconnector.

5. The low-voltage circuit breaker according to claim 1, wherein the first current measuring arrangement comprises a shunt.

6. The low-voltage circuit breaker according to claim 1, wherein the prespecifiable overcurrent comprises a short-circuit current.

7. The low-voltage circuit breaker according to claim 1, wherein the resistor is larger than 5 kΩ.

8. The low-voltage circuit breaker according to claim 7, wherein the resistor is larger than 10 kΩ.

9. A low-voltage circuit breaker, comprising:
at least one external conductor section of an external conductor power terminal of the low-voltage circuit breaker connected to an external conductor load terminal of the low-voltage circuit breaker; and
a neutral conductor section of a neutral conductor connection of the low-voltage circuit breaker connected to a neutral conductor load terminal of the low-voltage circuit breaker,
wherein a mechanical bypass switch is arranged in the at least one external conductor section,
wherein a semiconductor circuit arrangement of the low-voltage circuit breaker is switched parallel to the mechanical bypass switch,
wherein a first current measuring arrangement is arranged in the at least one external conductor section, which is connected to an electronic control unit of the low-voltage circuit breaker,
wherein the electronic control unit is configured to actuate the mechanical bypass switch and the semiconductor circuit arrangement when a prespecifiable overcurrent is detected by the current measuring arrangement,
wherein a snubber is arranged using a suitable circuit design in parallel with the semiconductor circuit arrangement, the snubber having a capacitor and a resistor, the resistor being arranged in a manner connected in parallel with the capacitor,
wherein the snubber is configured without a diode,
wherein the capacitor comprises an input terminal and an output terminal,
wherein the semiconductor circuit arrangement comprises an input terminal and an output terminal,
wherein the resistor comprises an input terminal and an output terminal,
wherein the input terminal of the capacitor is directly electrically coupled to the input terminal of the semiconductor circuit arrangement and to the input terminal of the resistor, and
wherein the output terminal of the capacitor is directly electrically coupled to the output terminal of the semiconductor circuit arrangement and to the output terminal of the resistor.

10. The low-voltage circuit breaker according to claim 9, wherein the mechanical bypass switch has an input terminal and an output terminal,
wherein the semiconductor circuit arrangement comprises a rectifier and a power semiconductor,
wherein a first terminal of the power semiconductor is electrically coupled via the rectifier to the input terminal of the mechanical bypass switch,
wherein a second terminal of the power semiconductor is electrically coupled via the rectifier to the output terminal of the mechanical bypass switch,
wherein the input terminal of the capacitor and the input terminal of the resistor of the snubber are both electrically coupled to the first terminal of the power semiconductor, and wherein the output terminal of the capacitor and the output terminal of the resistor of the snubber are both electrically coupled to the second terminal of the power semiconductor.

* * * * *